(12) United States Patent
O'Connor et al.

(10) Patent No.: US 6,449,672 B1
(45) Date of Patent: Sep. 10, 2002

(54) PCI DEVICE ARBITER

(75) Inventors: Stephen J. O'Connor, Mountain View; Robert L. Bailey, La Selva Beach, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/358,370

(22) Filed: Jul. 21, 1999

(51) Int. Cl.[7] .............................................. G06F 13/00
(52) U.S. Cl. ..................... 710/107; 710/110; 710/113
(58) Field of Search ................. 710/113, 110, 710/101, 107, 305, 241, 114

(56) References Cited

U.S. PATENT DOCUMENTS

| 5,592,631 A | | 1/1997 | Kelly et al. ................ 710/113 |
| 5,774,684 A | * | 6/1998 | Haines et al. ............... 710/305 |
| 5,870,570 A | * | 2/1999 | Chambers et al. ........... 710/113 |
| 6,308,248 B1 | * | 10/2001 | Welker et al. .............. 711/209 |

OTHER PUBLICATIONS

"PowerPC 601, RISC Microprocessor User's Manual," Motorola Inc., 1993, pp. 6–16 to 6–17 and 9–1 to 9–12.

* cited by examiner

Primary Examiner—Peter Wong
Assistant Examiner—Tim Vo
(74) Attorney, Agent, or Firm—Burns Doane Swecker & Mathis, L.L.P.

(57) ABSTRACT

An arbiter arbitrates between PCI agents within an ASIC. The ASIC interfaces with an external PCI bus. In operation, the arbiter receives request signals from the PCI agents, and in response thereto, generates a single external request signal. Once the grant is received by the ASIC, the arbiter will route it to a selected PCI agent. The selected agent then gains access to the PCI bus and all other agents are locked out until the transaction is completed. The arbiter is implemented in such a way that there is a minium delay between the generation of the request by any agent and the request sent out by the ASIC. This is performed by ORing all requests.

21 Claims, 6 Drawing Sheets

PCI DEVICE ARBITER

BACKGROUND

The present invention relates to a method and apparatus for arbitrating between devices connected to an input/output bus, such as a peripheral component interconnect (PCI) bus.

Computer systems typically include one or more buses which interconnect a plurality of devices. For instance, the conventional system 100 shown in FIG. 1 includes a central processing unit (CPU) 102 connected to a cache/memory system 110 via host bus 104. The CPU 102 can include any conventional microprocessor, such as a Motorola PowerPC™ RISC microprocessor. This microprocessor uses a protocol in which memory accesses are divided into address and data tenures.

Figure 1:
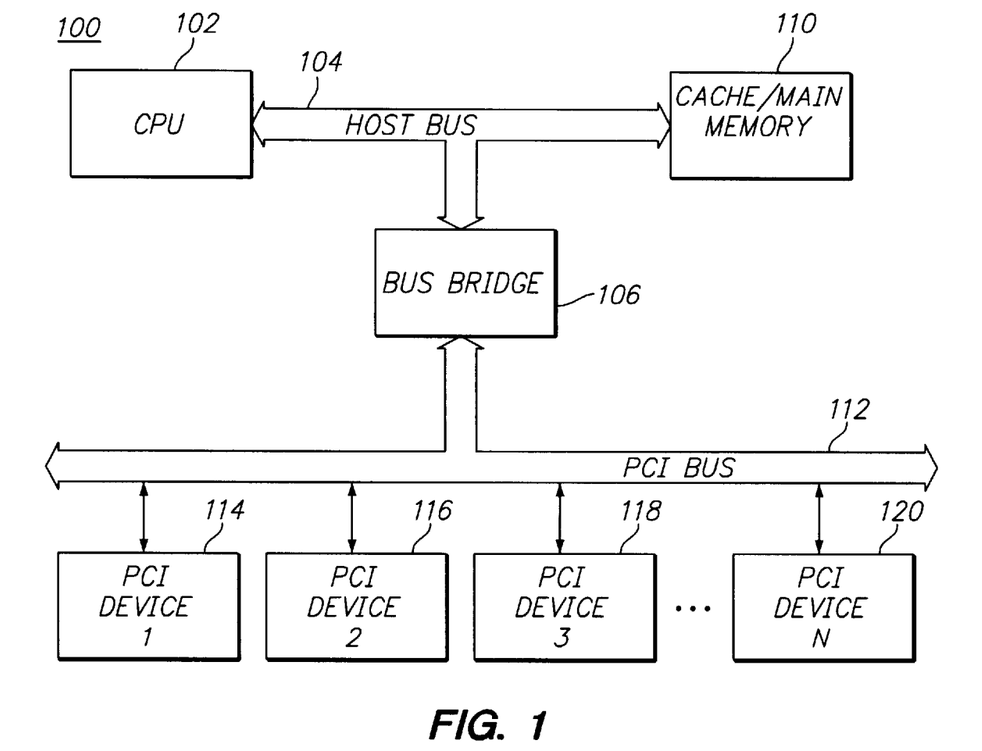
FIG. 1 shows a conventional system using a PCI bus.

The host bus 104 is also connected to a conventional bus bridge 106, which, in turn, is connected to an input/output bus, such as a peripheral component interconnect (PCI) bus 112. Various types of devices can be connected to the PCI bus, including various video and graphics accelerator cards, audio cards, telephony cards, SCSI (Small Computer Systems Interface) adapters, network interface cards, etc. These units are generically represented by PCI devices 114, 116, 118 and 120. In addition, although not shown, the PCI bus 112 can accommodate additional bus bridges which provide access to other buses, such as other PCI buses or ISA (Industry Standard Architecture) buses.

Although not shown, the PCI bus 112 includes a central arbiter connected thereto for arbitrating between plural requests by different PCI devices to access the PCI bus 112. Each device typically has a unique pair of request and grant signal connections to the central arbiter. A device requests the bus by asserting its request signal. When the arbiter determines that the device may use the bus, it asserts the grant signal. The grant signal gives the respective PCI device permission to use the bus for one transaction. If the device requires additional access to the bus, it must reassert its request signal. The arbitration algorithm may comprise some form of priority or round-robin protocol, or some hybrid form of these techniques.

Figure 2:
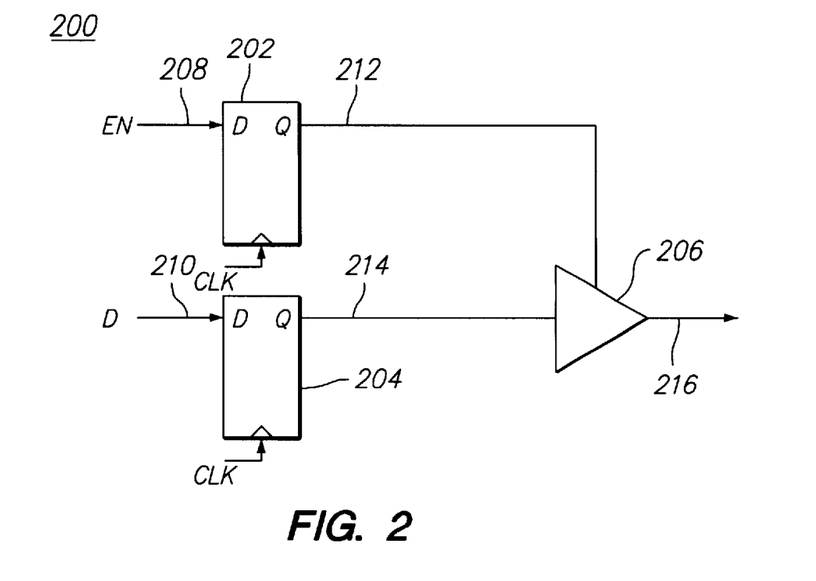
FIG. 2 shows output timing logic of a conventional PCI device.

Conventional logic 200 for interfacing a PCI device to the PCI bus 112 is shown in FIG. 2. The interface 200 includes two flip-flops 202, 204. Data is fed into flip-flop 204 via line 210, while an enable signal is fed into flip-flop 202 via line 208. The outputs of the flip-flops on lines 212 and 214 are fed to tristate buffer 206, which outputs the data on line 216. In operation, the enable signal "EN" determines whether the data stored within flip-flop 204 is fed out to the PCI bus 112. The clock signals supplied to the flip-flops ensures that their output is properly synchronized with the PCI bus 112.

Further details regarding the PCI standard can be found in PCI Local Bus Specification, Revision 2.2, PCI Special Interest Group, Dec. 18, 1998, which is incorporated herein by reference in its entirety.

Although the PCI bus protocol is in widespread use today, it has a number of limitations. For instance, each device which is coupled to the bus requires a request and grant pin for interfacing with the PCI bus arbiter. For instance, three devices would require the use of six pins. PCI bus arbiters typically include a fixed number of ports. The PCI bus also has load limits. Under the published standard, the maximum load value is ten where a PCI device is one load and a connector presents two loads. Hence, the PCI bus may be only capable of supporting a finite number of devices coupled to the bus.

These problems can be addressed by providing an additional bus bridge. That is, a bus bridge can be coupled to the PCI bus, which provides access to an expansion bus. The expansion bus, in turn, can support additional peripheral devices. However, bus bridges impose added regimes of clock cycles, which may lead to processing delays. Also, the bus bridge introduces an additional hierarchical layer in the bus protocol, which may causes complications during testing of the peripheral devices. In other words, because the peripheral device is buried in multiple bus layers, it may be difficult to track the behavior of the peripheral device under test. Bus bridges also add to the cost of the system.

It is possible to group together multiple peripheral devices in a common chip ASIC to reduce the space occupied by the plural devices and to more efficiently utilize system resources. However, this design does not address the above-noted problems, since the ASIC still includes separate devices which continue to interact with the PCI bus 112 in the same manner as conventional discrete devices. For instance, each of the PCI devices retains its pair of request and grant connections to the bus 112, resulting in the use of the same number of ports in the PCI bus arbiter as in the case of discrete devices.

SUMMARY

It is accordingly one exemplary objective of the present invention to provide a more efficient way of interfacing PCI devices to a PCI bus.

This objective is achieved according to the present invention by providing a PCI ASIC unit comprising multiple PCI agents (corresponding to discrete PCI devices) and an internal arbiter connected to a PCI bus. The agents transmit requests to use the PCI bus to the internal arbiter. On the basis of these requests, the internal arbiter generates a single request for output to an external PCI bus arbiter. The internal arbiter also selects which one of the agents shall be granted access to the bus. When a grant signal is received by the internal arbiter, the internal arbiter establishes a connection between the selected agent and the PCI bus such that the selected agent is granted access to the PCI bus to exchange data therewith. The selected agent corresponds to that agent which sent out its request to the external arbiter.

In the above-described configuration, the PCI ASIC has only a single request/grant pair which connects the ASIC to the PCI bus. This reduces the number of external PCI arbiter ports required to service the PCI ASIC. Further, the single request signal is sent out very quickly, such that the transaction is not unnecessarily delayed, in contrast to conventional bus bridge solutions.

According to another feature of the present invention, a single timing unit is used to control the timing of the interface to the multiple bus agents. Hence, all internal agents "look" the same at the interface. This reduces the complexity of the PCI ASIC and simplifies the testing of the multiple agents.

According to yet another feature of the present invention, a previously selected request is routed out for one clock after it finishes using the bus. The subsequent request sent out of the ASIC is the logical OR of individual requests. Once an individual request is selected, it is the only one which is sent. The delay of the logical OR is a useful measure to ensure that a previously selected agent can perform a PCI retry operation without interference from other agents.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail. In the drawings, like numerals represent like features.

The present invention may be used in the generic system architecture illustrated in FIG. 1. For instance, the CPU 102 can comprise the above-described Motorola PowerPC™ RISC microprocessor which uses a split-bus transaction protocol. The PCI bus 112 can be interfaced with the host bus 104 using the conventional bus bridge 106, or some other interface, such as the special interface chipset commonly used in Pentium™ processors. Those skilled in the art will appreciate that the principles described herein are applicable to other types of systems.

Figure 3:
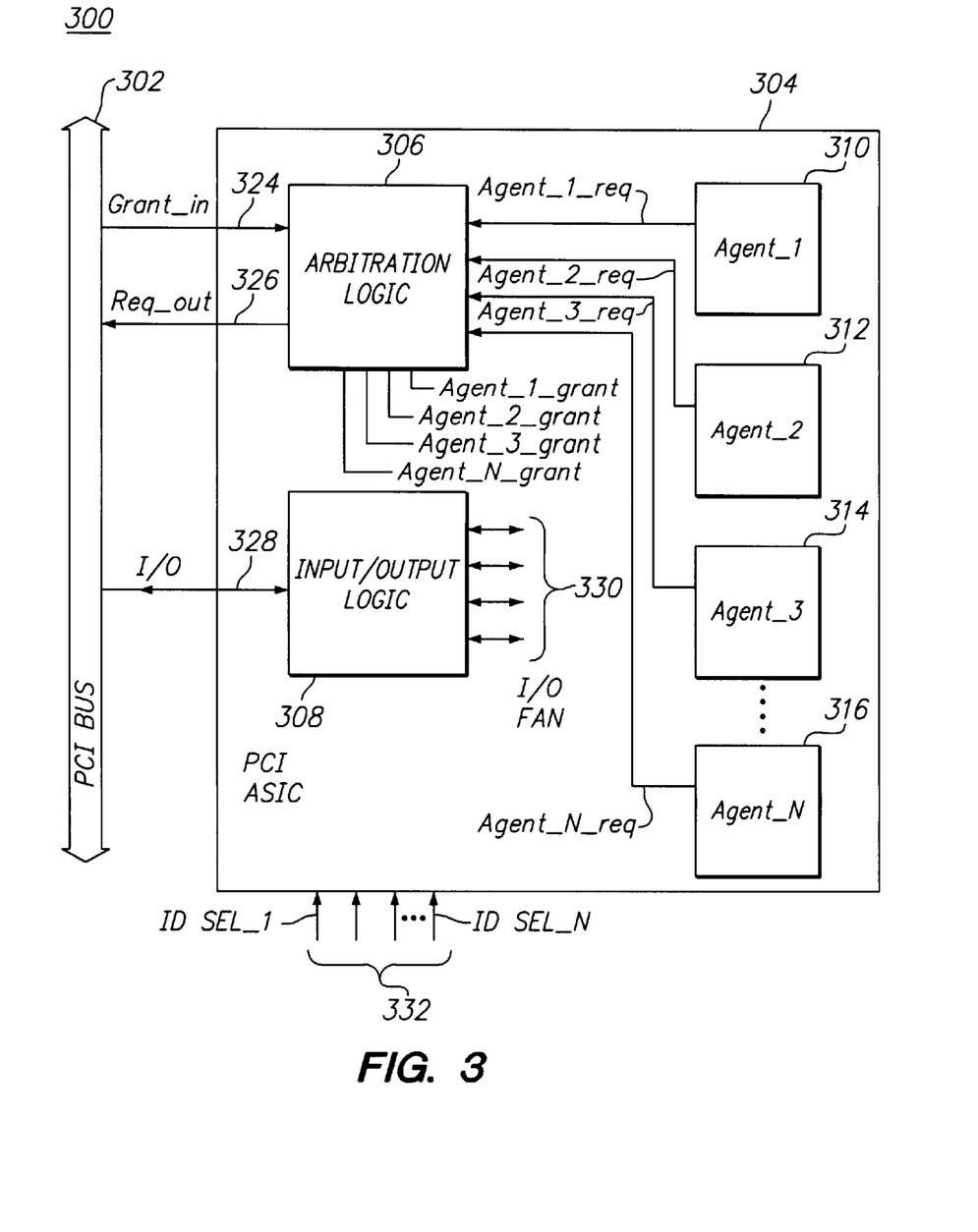
FIG. 3 shows one embodiment of a PCI ASIC according to the present invention.

FIG. 3 shows one embodiment 300 of the present invention. Notably, the discrete devices 114, 116, 118 and 120 (illustrated in FIG. 1) are now implemented on a common ASIC chip package 304. These chip devices are denoted more generally as Agent_1 (310), Agent_2 (312), Agent_3 (314) and Agent_N (316). There can be any multiple of agents on the common chip 304, including less than the designated four agents. The multiple agents can implement any functions normally assigned to the discrete PCI devices mentioned in the BACKGROUND section. For instance, these agents may provide the function of video and graphics accelerator cards, audio cards, telephony cards, SCSI (Small Computer Systems Interface) adapters, network interface (e.g., Ethernet) cards, etc. Further, various types of Universal Serial Bus (USB) device interfaces can be included within the chip 304.

The PCI ASIC 304 also includes internal arbitration logic 306 and input/output logic 308. The arbitration logic 306 receives requests from the multiple agents (e.g., Agent_1_req, Agent_2_req, Agent_3_req and Agent_N_req). The request are generated by the respective agents 310–316 when these agents require access to the PCI bus 302. The arbitration logic processes these requests and generates a single Req_out signal, which is sent out over the PCI bus 302 via line 326. The external arbiter also selects the device which shall be granted access to the PCI bus.

An external bus allocation mechanism (not shown) receives the Req_out signal and, in response to the Req_out signal, generates a Grant_in signal. The arbitration logic 306 receives the Grant_in signal via line 324 and effectively forwards the Grant_in signal to the selected agent in the form of the signals Agent_1_grant, Agent_2_grant, Agent_3_grant and Agent_N_grant.

The input/output logic 308 includes a plurality of fan-out lines (collectively denoted by 330) which connect the input/output logic 330 to the agents 310–316. For instance, if Agent_1 is selected by the arbitration logic 306, and the PCI ASIC 304 receives a grant, Agent_1 is coupled to the PCI bus 302 via the input/output logic 308.

One advantage of this configuration is that there is only one request/grant signal connection pair (324, 326) which connects the PCI bus 302 and the plurality of agents 310–316. Accordingly, more devices can be connected to the PCI bus 302 without using up the connection ports of the PCI external arbiter or exceeding the load limits of the PCI bus. Also, the individual requests (Agent___req, Agent_2_req, Agent_3_req, Agent_N_req) are quickly processed to produce the Req_out signal, and this signal is sent out over the PCI bus 302. Hence, the aggregation of plural agents 310–316 does not impose any additional bus cycle regimes, as would a conventional bus bridge. To the external system, the PCI ASIC 304 "appears" much as if it were a conventional discrete PCI device.

Logic blocks 306 and 308 are illustrated as discrete units to facilitate discussion. These units may be implemented as a single logical unit (e.g., as a single digital state machine).

Figure 4A:
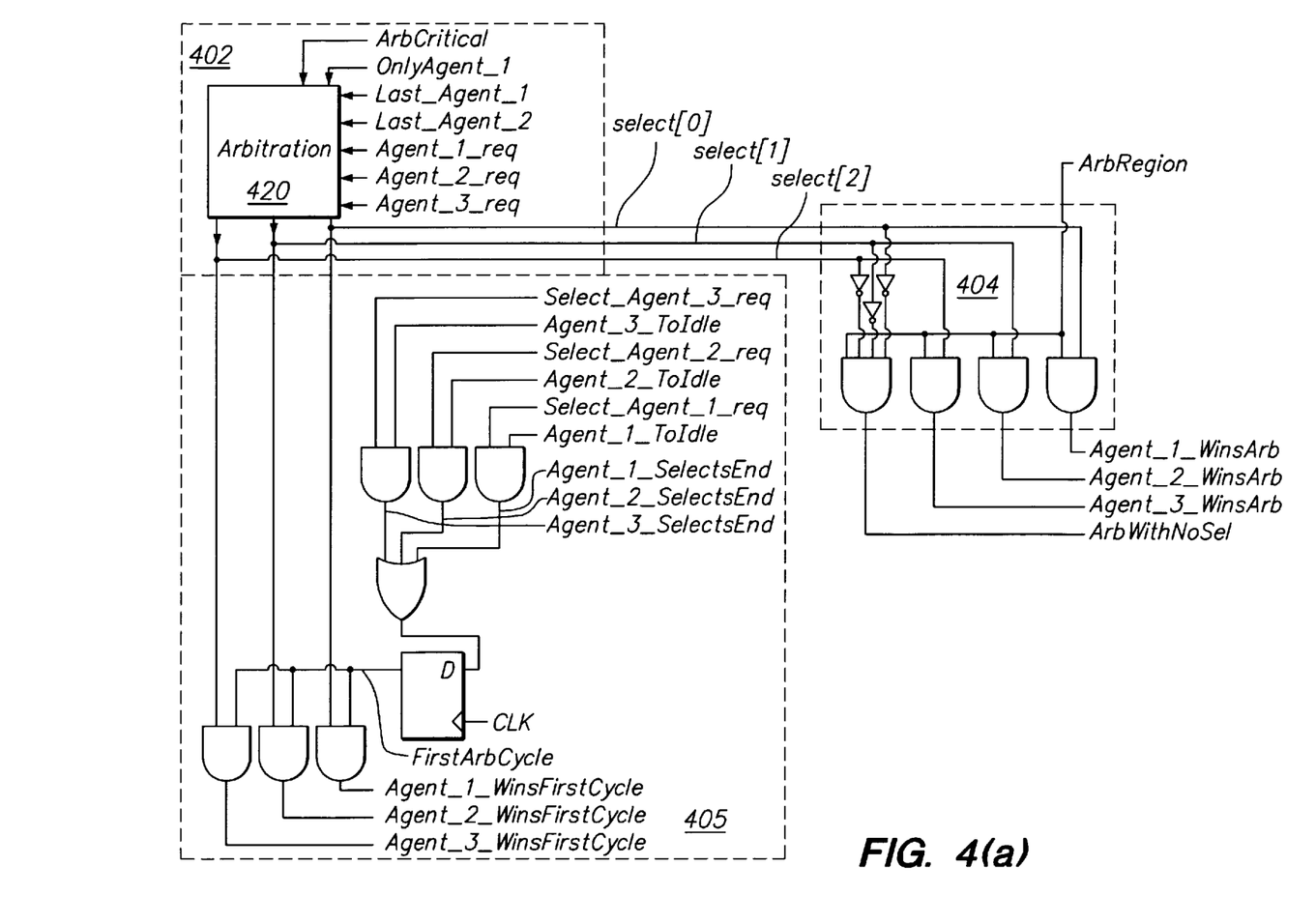
FIGS. 4(a), 4(b) and 4(c) show exemplary arbiter logic used in the PCI ASIC.
Figure 4B:
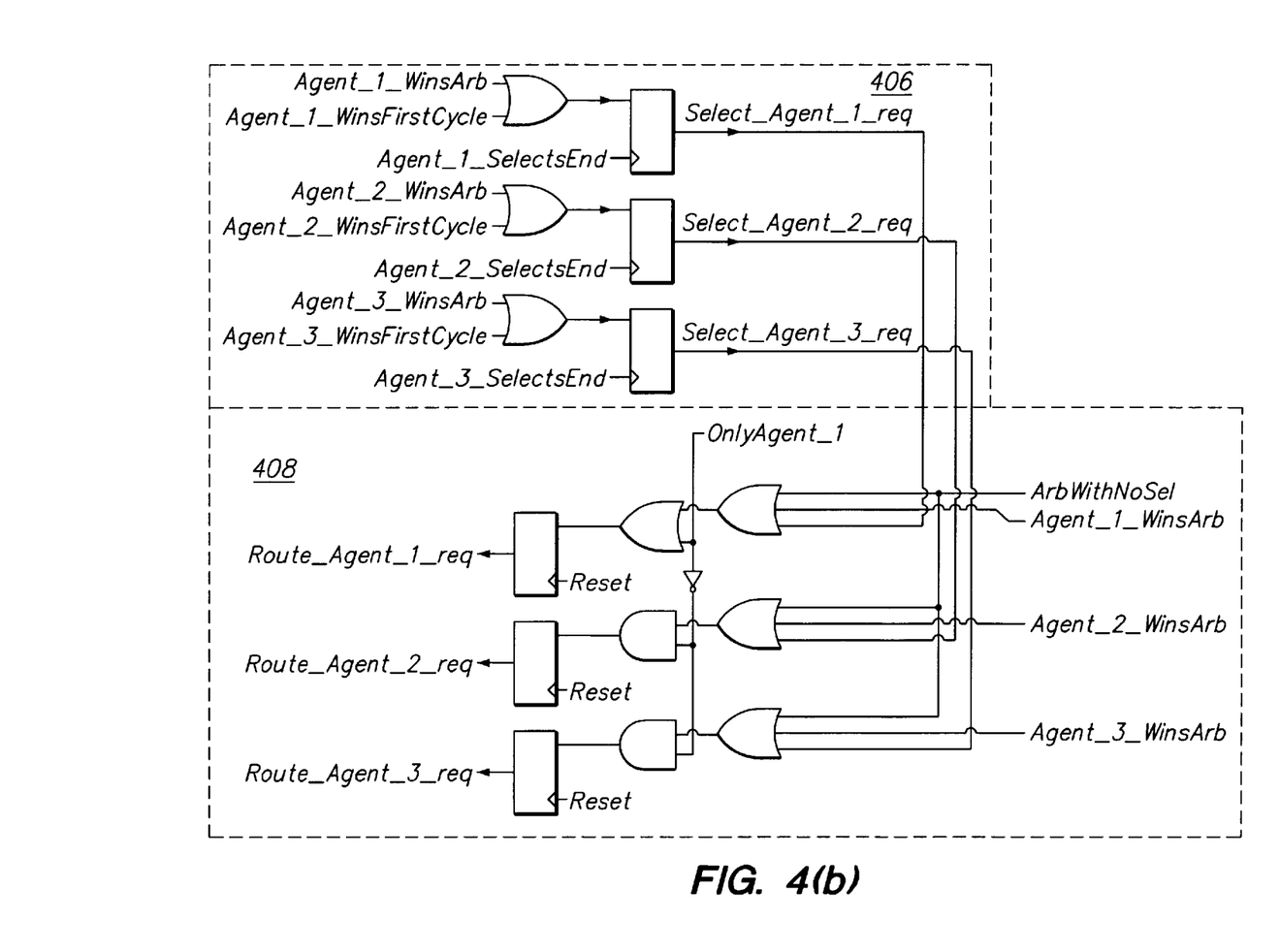
Figure 4C:
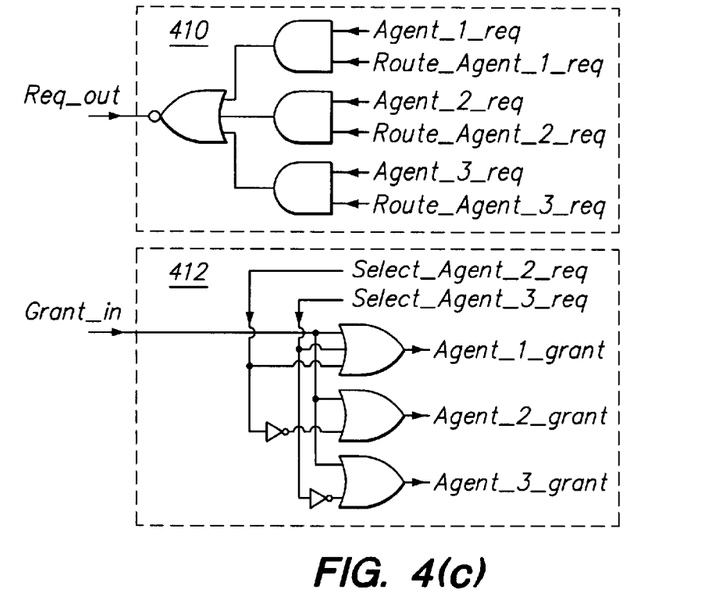

FIGS. 4(a), 4(b) and 4(c) illustrate exemplary logic modules used in arbitration logic 306. The logic functions shown there can be implemented by digital logic circuitry (e.g., a digital state machine), by a processor implementing a stored program, or by some combination of discrete logic circuitry and processor implementation. To facilitate discussion, an exemplary embodiment in which the PCI ASIC includes only three agents (Agent_1, Agent_2 and Agent_3) is considered.

FIG. 4(a) illustrates three modules which serve to arbitrate between requests generated by the agents. Arbitration unit 420 in module 402 constitutes the "heart" of these three modules. This unit receives requests generated by the three agents to use the PCI bus (i.e., requests Agent_1_req, Agent_2_req and Agent_3_req), as well as a signal which indicates whether Agent_1 was the last agent to be granted access to the bus (signal Last_Agent_1) and a signal which indicates whether Agent_2 was the last agent to be granted access to bus (signal Last_Agent_2). In one embodiment of the invention, Agent_1 may have a high priority, whereas Agent_2 and Agent_3 may have a lower priority than Agent_1. In this situation, the signal Last_Agent_2 toggles between Agent_2 and Agent_3 to indicate which one of these two agents was the later one to be granted access.

Further, the unit 420 receives two override signals, Arb-Critical and Only Agent_1. Based on these signals, the unit 420 decides which unit shall be granted access to the PCI bus. This decision is reflected in the output signal "select [n]." The signals select[0], select[1] and select[2] indicate which one of Agent_1, Agent_2 and Agent_3 has been selected. The rules used by the unit 420 in making a decision can be selected to suit the requirements of a particular application. One particular arbitration protocol will be discussed later.

Modules 404 and 405 process the output of module 402 by declaring the winner of arbitration. As discussed in greater detail below, in the present invention, a transaction is divided into two main processing time windows or "regions," comprising an arbitrate region and a selection region. The arbitrate region, in turn, is divided into a first cycle region and later cycle regions. During the first cycle, the last device selected by the arbitration logic is routed out. During the later cycle regions, all three requests are ORed together. The first cycle allows the PCI ASIC to perform a retry operation. That is, in conventional bus interfaces, when a bus agent performs a "retry," it will de-assert its request, and then later reassert the request. If there is a "winner" in the first cycle, the arbitration logic will immediately advance to the selection region.

With this background, module 405 outputs signals which reflect the winner of arbitration in the first cycle of arbitration (e.g., using output signals Agent_1_WinsFirstCycle, Agent_2_WinsFirstCycle and Agent_3_WinsFirstCycle), while module 404 selects the winner of arbitration in other cycles of arbitration (e.g., using output signals Agent_1_WinsArb, Agent_2_WinsArb and Agent_3_WinsArb).

Module 405 performs its function by logically ANDing the signals Select_Agent_1_req, Select_Agent_2_req and Select_Agent_3 req with signals Agent_1_ToIdle, Agent_2_ToIdle and Agent_3_ToIdle, respectively. The Select_Agent_n_req signals reflect agents that have been selected for access to the PCI bus. The Agent_n_ToIdle signals are outputs from the agents' respective state machines which indicate that the agents are relinquishing access to the PCI bus.

The ANDing of the Select_Agent_n_req and Agent_n_ToIdle signals produces signals Agent_1_SelectsEnd, Agent_2_SelectsEnd and Agent_3_SelectsEnd. These signals, in turn, are ORed together and then pass through a flip-flop to generate the signal FirstArbCycle. This signal logically defines the first cycle of the arbitration region (as discussed above). Finally, the FirstArbCycle signal is logically ANDed with the output of unit 402 to produce the signals Agent_1_WinsFirstCycle, Agent_2_WinsFirstCycle and Agent_3_WinsFirstCycle.

In similar fashion, module 404 logically ANDs the output of unit 402 with a signal "ArbRegion" to produce the signals Agent_1_WinsArb, Agent_2_WinsArb and Agent_3_Wins Arb. The ArbRegion signal defines the logical state in which arbitration takes place. Finally, module 404 also produces a signal ArbWithNoSel, which indicates that no agent has been selected . . . This signal is produced by ANDing the ArbRegion signal with the inverted output signals of unit 402.

FIG. 4(b) shows two modules, 406 and 408. The salient feature of module 406 is its generation of the Select_Agent_1_req, Select_Agent_2_req and Select_Agent_3_req signals. The Select_Agent_1_req is the logical OR of the Agent_1_WinsArb signal and the Agent_1_WinsFirstCycle signal, which sets a flip-flop, to generate the Select_Agent_1_req signal. When Agent_1 is terminating its use of the bus, the Agent_1_SelectsEnds signal clears the flip-flop, to remove the Select_Agent_1_req signal. Similar logic is employed for the other two agents.

One salient feature of module 408 is its generation of Route_Agent_1_req, Route_Agent_2_req and Route_Agent_3_req signals . . . Route_Agent_1_req is the logical OR of the signals ArbWithNoSel, Agent_1_WinsArb, Select_Agent_1_req and Only_Agent_1. The Route_Agent_2_req signal is produced by logically ORing the signals ArbWithNoSel, Agent_2_WinsArb and Select_Agent_2_req together, and then logically ANDing this result with the inverse of the signal Only_Agent_1. Similar logic is used to generate the signal Route_Agent_3_req.

FIG. 4(c) illustrates modules 410 and 412. Module 410 constitutes the circuitry which finally outputs the single request Req_out to the external PCI arbiter (not shown). The Req_out signal is the logical NOR of signals (Agent_1_req & Route_Agent_1_req), (Agent_2_req & Route_Agent_2_req) and (Agent_3_req & Route_Agent_3_req), where "&" denotes a logical AND operation.

Module 412 constitutes the circuitry which routes the grant signal Grant_in received from the external arbiter to the selected agent using signals Agent_1_grant, Agent_2_grant and Agent_3_grant. This selection is performed using the OR gate and inverter configuration shown there. More specifically, the Agent_1_grant signal is the logical OR of the Grant_in, Select_Agent_2_req and the Select_Agent_3_req signals. The Agent_2_grant signal is the logical OR of the Grant_in and inverted Select_Agent_2 signal. The Agent_3_grant signal is the logical OR of the Grant_in and inverted Select_Agent_3 signal.

Figure 5:
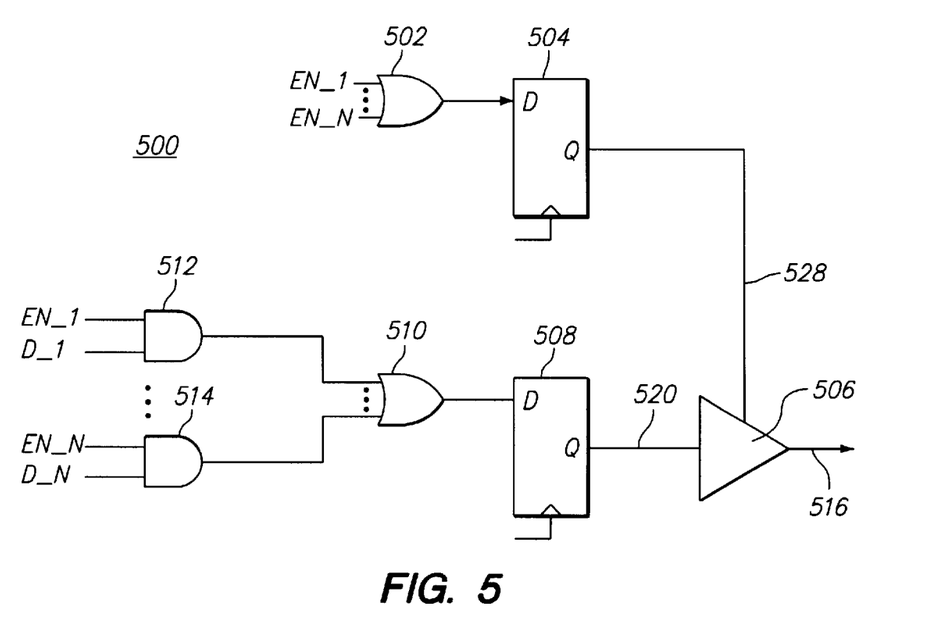
FIG. 5 shows timing logic used for the interface of the PCI ASIC.

FIG. 5 shows elements of the timing logic 500 used to output data from the PCI ASIC 304 to the PCI bus 302. As shown there, the logic includes a plurality of AND gates 512, 514 which gate data signals (D_1 through D_N) from the agents on the basis of a plurality of respective enable signals (EN_1 through EN_N). The outputs of the AND gates 512, 514 are combined in the OR gate 510, and are then fed to a first flip-flop 508. The output 520 of the flip-flop 508 is fed to a data input of tristate buffer 506, which provides the final data output 516. In another path, the plural enable signals (EN_1 through EN_N) are combined in OR gate 502, the output of which is fed to a second flip-flop 504. The output of the second flip-flop 504 is then fed over line 528 to an enable input of output buffer 506.

The logic 500 is intended to operate in a related manner as the logic 200 shown in FIG. 2. However, unlike FIG. 2, each PCI device does not have its own timing flip-flop 202. Instead, the PCI agents in the FIG. 5 embodiment share common timing flip-flops 504 and 508. It is also possible to perform the combining function "after" the flip-flops. The use of common timing reduces the complexity of the logic and also simplifies testing of the PCI agents.

FIG. 3 indicates that the PCI ASIC 304 can include a plurality of selection inputs 332. These selection inputs are used to configure the individual PCI devices by the bridge during an initial set-up mode, to indicate which address each device should respond to.

Having set forth the exemplary structural configuration of the PCI ASIC 304, the functional characteristics of this device will now be discussed in greater detail with reference to FIG. 6 . . . Again, to facilitate discussion, an exemplary embodiment in which the PCI ASIC includes only three agents (Agent_1, Agent_2 and Agent _3) is considered.

Figure 6:
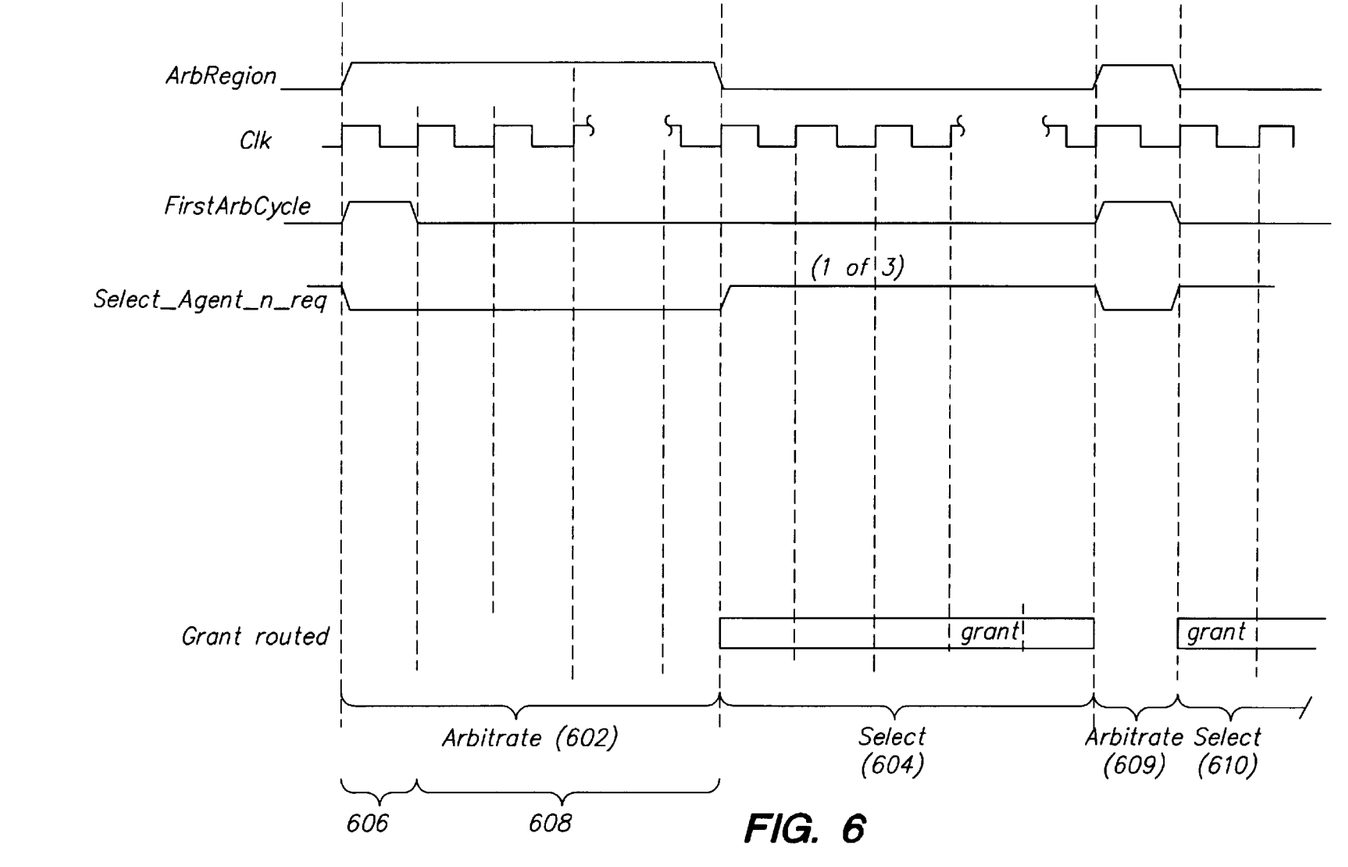
FIG. 6 shows timing diagrams which illustrate how an exemplary PCI ASIC operates.

FIG. 6 is an exemplary logic state diagram to illustrate the operation of the arbitration logic 306. As mentioned above, a bus transaction is divided into two main regions: the arbitrate region 602 and the selection region 604. The arbitrate region 602, in turn, is divided into a first cycle region 606 and later cycle regions 608. During the first cycle region 606, the last device selected by the arbitration logic is routed out. During the later cycle regions 608, all three requests are ORed together. During the selection region 604, the selected request is routed out and the grant is routed to the selected device. The cycle 609 after the selection region 604 continues to route out the selected request.

The first cycle 606 allows a selected agent to perform a retry operation without interference from other agents. More specifically, in a "retry" operation, an agent will de-assert its request, and then reassert the request . . . The de-assertion of a PCI agent is detected by examining the state of the PCI agent's state machine (e.g., note the discussion of the Agent_n_ToIdle signal in the context of FIG. 4(a)). Detection of this de-assertion terminates the selection region 604. In the next cycle (e.g., the first cycle 609), the arbitration logic refrains from ORing all of the requests together. This gives the selected agent (from the previous selected region 604) an opportunity to quickly deassert the request without interference from a concurrent request by some other agent. In this manner, the retry protocol can proceed in the usual manner.

Arbitration can still occur in the first cycle 606 of the arbitration region 602, even when the previously selected request is being routed out. In this case, the selected request will be sent out in the next cycle. Also, the protocol immediately advances to the select region 604 when there is a "winning" agent in the first cycle 606. For instance, note cycle 609. There is a "winner" selected in this cycle, so the later regions of arbitration are omitted. In other words, the selection region 610 immediately follows the arbitrate region 609.

The arbitration algorithm itself is application-specific and may comprise any type of priority, round-robin or fairness technique, or some hybrid of these techniques. For instance, in one exemplary embodiment discussed previously, the arbitration logic 306 can give highest priority to Agent_1. Agent_2 and Agent_3 can be assigned the same priority level, which can be lower than the priority of Agent_1. Accordingly, the arbitration logic 306 can "ping-pong" between Agent_and the group consisting of Agent_2 and Agent_3. For instance, upon power-up, competing bus requests will be resolved by granting Agent_1 the use of the bus. In the next transaction, however, competing bus requests will be resolved by granting Agent_2 use of the bus. In the next such transaction, Agent_1 is again given priority. In the next transaction, Agent_3 will finally receive priority. Thus, Agent_1 is effectively assigned a 50% share of bus usage, while each of Agent_2 and Agent_3 are assigned a 25% share of bus usage.

When there are no requests, the bus can be parked on one of the agents, preferably the highest priority bus master (e.g., Agent_1 in this example). Also, the arbitration logic 306 can include various assignment overrides. For instance, an override condition can be set when it is desired to grant all bus accesses to one of the agents, such as Agent_1.

For purposes of illustration, consider the following exemplary algorithm. The algorithm makes a decision based on the pending requests from the agents, e.g., Agent_1_req, Agent_2_req, and Agent_3_req. The algorithm also makes its decision based on the variables Last_Agent_1 and Last_Agent_2. The values of these variables (i.e., '1' or '0') indicate whether these agents received access to the bus in a previous transaction. Further, the algorithm is based on the two override variables ArbCritical and OnlyAgent_1. The ArbCritical signal will cause Agent_1 to always be granted access to the bus. The OnlyAgent_1 signal indicates that, if Agent_2 or Agent_3 would normally be granted access, then no device is granted access, i.e. Agent_2 and Agent_3 cannot gain access. This combination of variables can be represented by a 7-bit field "case", e.g., case= {Agent_2_req, Agent_3_req, Agent_1_req, Last_Agent_1, Last_Agent_2, ArbCritical, OnlyAgent_1}. For instance, the field case=111_1100 indicates that all three agents have requested use of the bus, and that Agent_1 and Agent_2 received the bus in previous transactions. The output of the algorithm can be represented by a 3-bit field "select." The bit entries in the field "select" represent whether a corresponding agent is selected. The first entry in the field corresponds to Agent_1, the second entry in the field corresponds to Agent _2, and the third entry in the field corresponds to the Agent_3, e.g. select={Sel_Agent_3, Sel_Agent_2, Sel_Agent_1} . . . For instance, select=100 indicates that Agent_3 is selected. Select=100 is the appropriate selection for the above-discussed case of 111_1100, since this input field indicates that all three agents have requested use of the PCI bus 302, and that, in the most recent transactions, Agent_1 and Agent_2 were selected subsequent to Agent_3.

The following provides the complete state description of the above-described exemplary algorithm, which is divided into different scenarios depending on whether there is one request, two requests or three requests. The symbol "x" indicates that the values of the select field are not dependent on whether x=0 or x=1.

No requests
case=000_xxxx→select=000

One requests
case=001_xxxx→select=001
case=010_xxx0→select=100
case=010_xxx1→select=000
case=100_xxx0→select=010
case=100_xxx1→select=000

Two requests: Agent_1 and Agent_3
case=011_xx1x→select=001
case=011_1x00→select=100
case=011_1x01→select=000
case=011_0x0x→select=001

Two requests: Agent_1 and Agent_2
case=101_xx1x→select=001
case=101_1x00→select=010
case=101_1x01→select=000
case=101_0x0x→select=001

Two requests: Agent_2 and Agent 3
case=110_x1x0→select=100
case=110_x1x1→select=000
case=110_x0x0→select=010
case=110_x0x1→select=000

Three requests: Agent_1, Agent_2 and Agent_3
case=111_xx1x→select=001
case=111_1100→select=100
case=111_1101→select=000
case=111_1000→select=010
case=111_1001→select=000
case=111_0x0x→select=001

The winner of the arbitration is assigned in accordance with the values in the "select" field. This can be performed by logically ANDing the select[0], select[1] and select[2] bit values with a variable "ArbRegion," which indicates whether the arbitration window (represented by the arbitrate region 602 in FIG. 6) is active or not. The results of this ANDing can be represented by the variables Agent_1_WinsArb, Agent_2_WinsArb, and Agent_3_WinsArb (as discussed above in the context of FIG. 4(a)). Further, a variable ArbWithNoSel indicates that an agent has not been selected.

As a last cycle of the arbitration algorithm, the arbitration logic 306 determines whether any of the agents has ended their transaction. This can be determined by examining the state machine of each agent.

The present invention has been discussed in the context of an arbiter which allocates a PCI bus to a pool of PCI devices. But the invention is also generally applicable to other types of bus protocols and architectures . . . For instance, the techniques described here are generally applicable to any grouping of bus agents which access a bus using an internal arbiter in the manner described above. Further, the preferred embodiment employs plural agents implemented in an ASIC. Yet the agents may remain discrete entities and still retain the functional attributes and advantages of the present invention. That is, the above-described "internal" arbiter may be more generally considered as a "local" arbiter in the sense that it performs arbitration between plural requests before a higher level request is sent out on the PCI bus. This configuration realizes the same reduction in external arbiter pin usage and bus loading as the above-described configuration, in which a common ASIC contains both the PCI agents and the arbiter.

Still other variations of the above described principles will be apparent to those skilled in the art. All such variations and modifications are considered to be within the scope and spirit of the present invention as defined by the following claims.

What is claimed is:

1. An apparatus for interfacing with a bus, comprising:
    a first agent, said first agent including logic for generating a first request signal which indicates that said first agent requests use of said bus;
    a second agent, said second agent including logic for generating a second request signal which indicates that said second agent requests use of said bus; and
    arbitration logic for:
        receiving the first and second request signals from said first and second agents, respectively, and, on the basis thereof, logically ORing said first and second request signals after a delay in order to allow a previously selected agent to perform a retry operation and in response thereto generating a single bus request signal and transmitting said single bus request signal to an external arbiter;
        selecting which one of said first or second agents should be allocated use of said bus for a given transaction;
        receiving a single grant signal in response to the generation and transmitting of the single bus request signal; and
        granting said selected agent use of said bus.

2. The apparatus of claim 1, wherein said arbitration logic further includes logic for ORing the first and second request signals received from the first and second agents, respectively.

3. The apparatus of claim 1, wherein said arbitration logic arbitrates between said first and second agents based on stored information regarding a previous agent which received a grant.

4. The apparatus of claim 1, wherein said arbitration logic performs arbitration in a plurality of logical windows, including:
    an arbitrate region for arbitrating between plural requests to use said bus; and
    a selection region in which a selected request is routed out.

5. The apparatus of claim 1, further including input/output logic having a single timing unit for determining the timing for data output from both said first and second agents to said bus.

6. The apparatus of claim 1, wherein said bus is governed by a Peripheral Component Interconnect standard.

7. The apparatus according to claim 1, wherein said first and second agents are implemented on a common ASIC.

8. The apparatus of claim 4, wherein said arbitrate region includes a first cycle in which a last device selected by the arbitration logic is routed out.

9. The apparatus according to claim 7, wherein said arbitration logic is implemented on said common ASIC.

10. A computer system, comprising:
    a host processor;
    a host bus connecting said host processor to a main memory;
    a bus bridge;
    a peripheral bus connected to said host bus via said bus bridge;
    a first peripheral agent, said first peripheral agent including logic for generating a first request signal which indicates that said first peripheral agent requests use of said peripheral bus;
    a second peripheral agent, said second peripheral agent including logic for generating a second request signal which indicates that said second peripheral agent requests use of said peripheral bus;
    arbitration logic for:
        receiving the first and second request signal from said first and second peripheral agents, respectively, and, on the basis thereof, logically ORing said first and second request signals after a delay in order to allow a previously selected agent to perform a retry operation and in response thereto generating a single bus request signal and transmitting said single bus request signal to an external arbiter;
        selecting which one of said first or second agents should be allocated use of said peripheral bus for a given transaction;
        receiving a single grant signal in response to the generation and transmitting of the single bus request signal; and
        granting said selected agent use of said bus.

11. The system of claim 10, wherein said arbitration logic further includes logic for ORing the first and second request signals received from the first and second agents, respectively.

12. The system of claim 10, wherein said arbitration logic arbitrates between said first and second agents based on stored information regarding a previous agent which received a grant.

13. The system of claim 10, wherein said arbitration logic performs arbitration in a plurality of logical windows, including:
    an arbitrate region for arbitrating between plural requests to use said bus; and
    a selection region in which a selected request is routed out.

14. The system of claim 10, further including input/output logic having a single timing unit for determining the timing for data output from both said first and second agents to said peripheral bus.

15. The system of claim 10, wherein said bus is governed by a Peripheral Component Interconnect standard.

16. The system according to claim 10, wherein said first and second agents are implemented on a common ASIC.

17. The system of claim 13, wherein said arbitrate region includes a first cycle in which a last device selected by the arbitration logic is routed out.

18. The system according to claim 16, wherein said arbitration logic is implemented on said common ASIC.

19. An arbiter for use in a system including first and second agents capable of interfacing with a bus, the first agent including logic for generating a first request signal which indicates that the first agent requests use of the bus, the second agent including logic for generating a second request signal which indicates that the second agent requests use of the bus, the arbiter comprising:

logic for receiving the first and second request signals from said first and second agents, respectively, and on the basis thereof, logically ORing said first and second request signals after a delay in order to allow a previously selected agent to perform a retry operation and in response thereto generating a single bus request signal and transmitting said single bus request signal to an external arbiter;

logic for selecting which one of said first or second agents should be allocate use of the bus for a given transaction;

logic for receiving a single grant signal in response to the generation and for transmitting of the single bus request signal; and logic for granting said selected agent access to the bus.

20. A method for arbitrating between a first and second agents, comprising the steps of:

transmitting a first request signal from a first agent when said first agent requires access to a bus;

transmitting a second request signal from a second agent when said second agent requires access to the bus;

receiving said first and second request signals in an arbitration unit;

performing arbitration by logically ORing said first and second request signals after a delay in order to allow a previously selected agent to perform a retry operation, and in response, selecting one of said first or second agents to gain access to said bus;

generating a single output request signal and transmitting said single output request signal to an external arbiter;

in response to said single response signal, receiving a grant signal; and granting bus access to said selected agent.

21. The method of claim 20, wherein at least part of said arbitration occurs subsequent to said step of transmitting said single output request.

\* \* \* \* \*